United States Patent [19]
Ozawa et al.

[11] Patent Number: 5,788,547
[45] Date of Patent: Aug. 4, 1998

[54] EXHAUST PIPE COOLING SYSTEM FOR WATERCRAFT

[75] Inventors: Shigeyuki Ozawa; Ryoichi Nakase, both of Iwata; Hiroaki Fujimoto, Hamamatsu, all of Japan

[73] Assignee: Yamaha Hatsudoki Kabushiki Kaisha, Shizuoka, Japan

[21] Appl. No.: 692,875

[22] Filed: Aug. 2, 1996

[51] Int. Cl.$^6$ .................................................. B63H 21/32
[52] U.S. Cl. ................................................. 440/89; 440/88
[58] Field of Search ........................ 440/88, 89, 38; 114/183 R; 60/286, 298

[56] References Cited

U.S. PATENT DOCUMENTS

| | | | |
|---|---|---|---|
| 3,198,162 | 8/1965 | Larsen | 440/89 |
| 3,899,765 | 8/1975 | Daigneault, Jr. | 337/386 |
| 4,664,054 | 5/1987 | Nishida . | |
| 4,773,883 | 9/1988 | Nakase et al. . | |
| 4,789,367 | 12/1988 | Fulks | 114/183 R |
| 4,811,560 | 3/1989 | Nakase et al. . | |
| 4,831,822 | 5/1989 | Yoshimura | 60/310 |
| 4,850,908 | 7/1989 | Nakase et al. | 114/83 R |
| 4,982,682 | 1/1991 | Hattori . | |
| 4,989,409 | 2/1991 | Nakase et al. . | |
| 4,997,399 | 3/1991 | Nakayasu et al. . | |
| 5,067,448 | 11/1991 | Nakase et al. . | |
| 5,096,446 | 3/1992 | Tazaki et al. . | |
| 5,167,934 | 12/1992 | Wolf et al. | 440/89 |
| 5,199,913 | 4/1993 | Toyohara et al. | 440/47 |
| 5,234,364 | 8/1993 | Ito . | |
| 5,251,439 | 10/1993 | Nakase et al. . | |
| 5,324,217 | 6/1994 | Mineo . | |
| 5,366,401 | 11/1994 | Nanami et al. . | |
| 5,562,509 | 10/1996 | Nakase et al. | 440/89 |

*Primary Examiner*—Ed Swinehart
*Attorney, Agent, or Firm*—Knobbe, Martens, Olson & Bear, LLP

[57] ABSTRACT

An exhaust pipe cooling system is provided for a small watercraft, such as a personal watercraft, to regulate the temperature of a catalyzer of an associated exhaust system. The cooling system supplies fresh water to a water jacket which surrounds the catalyzer in a manner independent of an engine cooling system. A control valve also can regulate the flow rate of water through the cooling system to adjust the temperature of the catalyzer to fall within a desired range of operating temperatures.

27 Claims, 5 Drawing Sheets

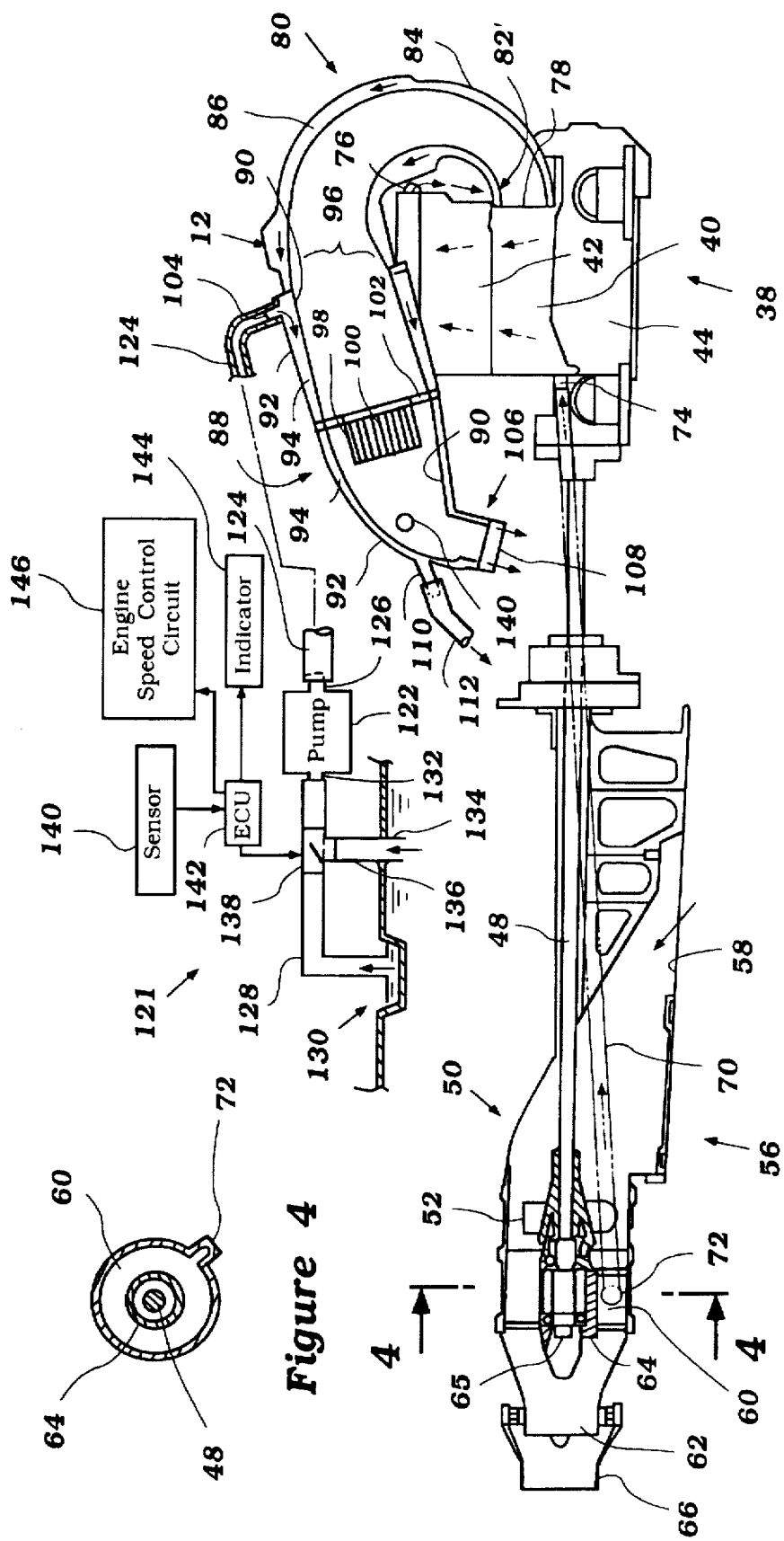

EXHAUST PIPE COOLING SYSTEM FOR WATERCRAFT

BACKGROUND OF THE INVENTION

1. Field of the Invention

The present invention relates to an exhaust system for a watercraft, and more particularly to cooling system for an exhaust system of a watercraft.

2. Description of Related Art

Personal watercrafts have become very popular in recent years. This type of watercraft is quite sporting in nature and carries a rider and possibly one or two passengers. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull that forms a front gullet portion of the tunnel.

An exhaust system of the personal watercraft discharges engine exhaust to the atmosphere either through or close to the body of water in which the watercraft is operating. Although submerged discharge of engine exhaust silences exhaust noise, environmental concerns arise. These concerns are particularly acute in connection with two-cycle engines because engine exhaust from two-cycle engines often contains lubricants and other hydrocarbons.

Such environmental concerns have raised a desire to minimize exhaustion of hydrocarbons and other exhaust byproducts (e.g., carbon monoxide and oxides of nitrogen) and thus reduce pollution of the atmosphere and the body of water in which the watercraft is operated. In response to the increased concerns regarding exhaust emissions, several outboard motors recently have become equipped with a catalyst to convert exhaust byproducts to harmless gases.

Catalysts must operate at a relatively high temperature in order to the necessary thermal reaction and burning of the exhaust byproducts. A catalyzer thus desirably operates within a specific range of temperature so as to effectively and efficiently convert engine exhaust into generally harmless gases.

SUMMARY OF THE INVENTION

One aspect of the present invention involves a cooling system for an exhaust system including a catalyzer. The cooling system regulates the temperature of the catalyzer within a desired range of operating temperatures. For this purpose, the cooling system desirably supplies coolant to a cooling jacket around the catalyzer independent of an engine cooling system.

In one application of the present invention, a small watercraft, such as a personal watercraft, is provided with an internal combustion engine. The engine includes at least one exhaust port and an output shaft which drives a propulsion device. An exhaust system extends between the engine exhaust port and a discharge port, and includes a catalyzer to treat exhaust gases from the engine before discharge through the exhaust port. A cooling jacket extends along a portion of the exhaust system in the vicinity of the catalyzer. A coolant supply system communicates with the cooling jacket independent of the engine to cool the catalyzer.

Another aspect of the present invention involves a watercraft comprising an internal combustion engine. The engine has at least one exhaust port and an output shaft which drives a propulsion device. An exhaust system extends between the engine exhaust port and a discharge port, and includes a catalyzer to treat exhaust gases from the engine before discharge through the exhaust port. A cooling jacket extends along a portion of the exhaust system in the vicinity of the catalyzer. A coolant supply system communicates with the cooling jacket and with a source of fresh coolant to directly supply fresh coolant to the cooling jacket.

In accordance with an additional aspect of the present invention, a watercraft is provided having an internal combustion engine disposed within a hull of the watercraft. The engine has at least one exhaust port which communicates with an exhaust system that delivers engine exhaust to a discharge port. A cooling jacket extends along a portion of the exhaust system. The watercraft also includes a bilge system having a bilge pump. The bilge pump communicates with the cooling jacket to pump bilge water from a bilge area of the hull to the cooling jacket to provide additional cooling of the portion of the exhaust system.

BRIEF DESCRIPTION OF THE DRAWINGS

These and other features of the invention will now be described with reference to the drawings of preferred embodiments of the exhaust system. The different embodiments of the invention are intended to illustrate and not to limit the invention. To assist the reader's understanding of the description of the embodiments which follow, the following provides a brief description of the referenced drawing:

FIG. 3 is a schematic view of the exhaust pipe cooling system of FIG. 1 shown with a portion of an exhaust system, an engine and a jet propulsion unit of the personal watercraft;

FIG. 4 is a cross-sectional view of the jet propulsion unit of FIG. 3 taken along line 4—4;

DETAILED DESCRIPTION OF PREFERRED EMBODIMENTS

Figure 1:
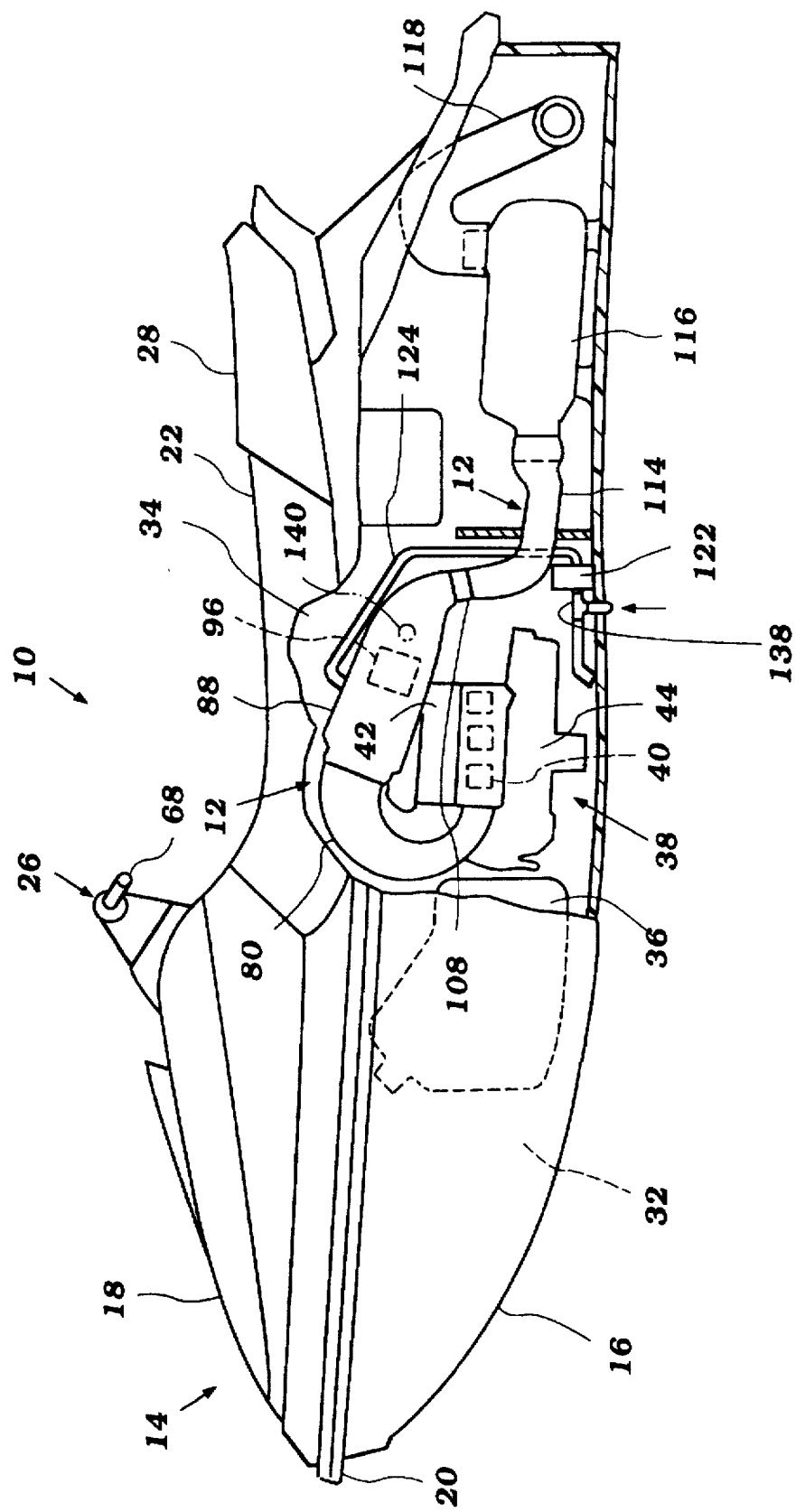
FIG. 1 is a partial sectional, side elevational view of a personal watercraft including an exhaust pipe cooling system configured in accordance with a preferred embodiment of the present invention.
Figure 2:
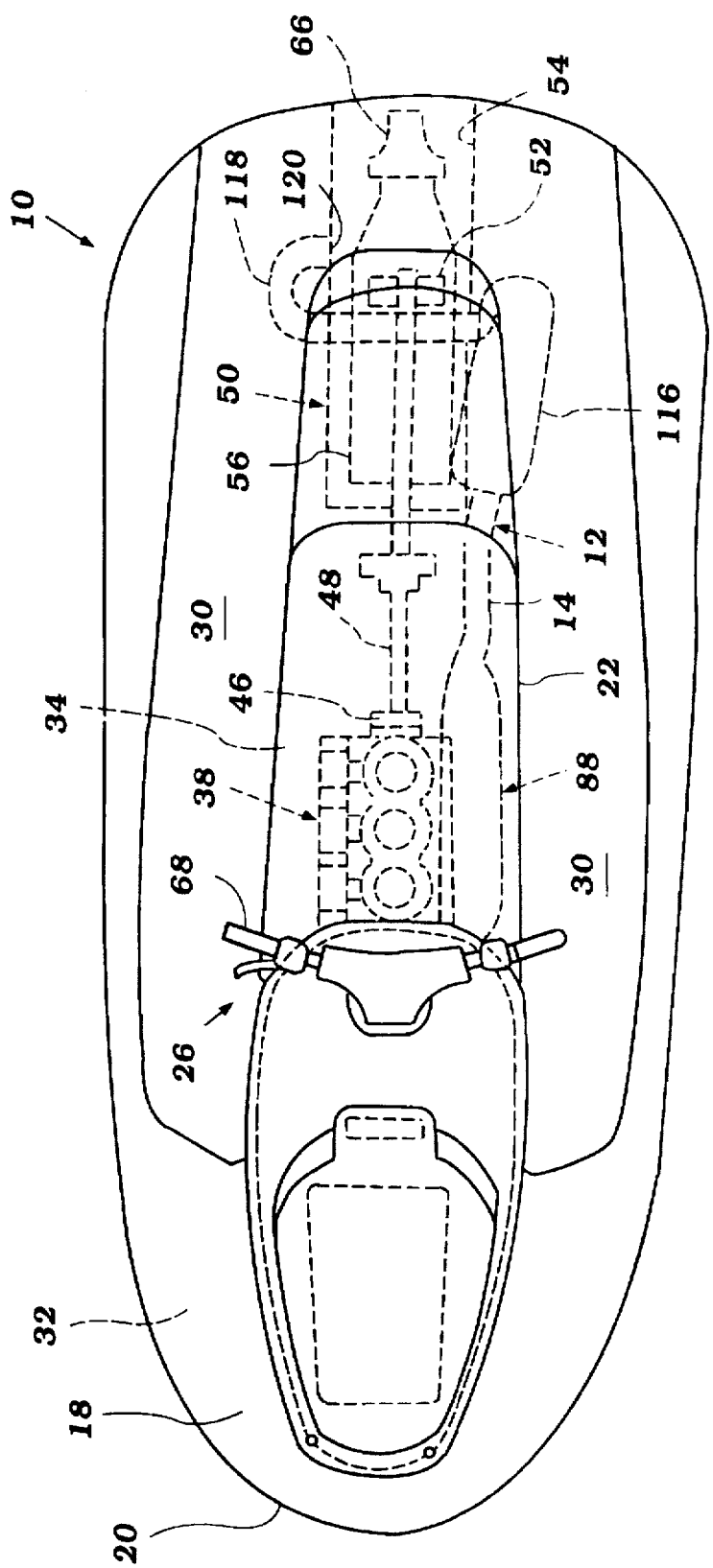
FIG. 2 is top plan view of the watercraft of FIG. 1.

FIGS. 1 and 2 illustrate a personal watercraft 10 which includes an exhaust pipe cooling system configured in accordance with a preferred embodiment of the present invention. Although the present exhaust pipe cooling system is illustrated in connection with an exhaust system 12 for a personal watercraft, the cooling system can be used with other types of watercraft as well, such as, for example, but without limitation, small jet boats and the like.

Before describing the exhaust pipe cooling system, an exemplary personal watercraft 10 will first be described in general details to assist the reader's understanding of the environment of use and the operation of the cooling system. The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

A passenger seat 22 is provided proximate to the stern of the hull 14. The passenger seat 22 is mounted longitudinally along the center of the watercraft 10. In the illustrated embodiment, the seat 22 has a longitudinally extended straddle-type shape which may be straddled by an operator and by at least one or two passengers. A forward end 24 of the seat 22 lies proximate to the controls 26 of the watercraft 10 which generally lie at about the longitudinal center of the watercraft 10. This position of the operator on the watercraft 10 gives the watercraft fore and aft balance when the operator rides alone. A rear portion 28 of the seat 22 is configured to allow one or two passengers to be comfortably seated behind the operator of the watercraft 10. The seat 22 desirably includes a removable seat cushion to increase the comfort of the operator and the passengers.

As seen in FIG. 2, the upper deck section 18 of the hull 14 advantageously includes foot areas 30. The foot areas 30 extend generally longitudinally and parallel to the sides of the elongated seat 22 so that the operator and any passengers sitting on the seat 22 can place their feet in the foot areas 30. A non-slip surface (not shown) is located in the foot areas 30 to provide increased grip and traction for the operator and the passengers.

The lower hull section 16 of the personal watercraft 10 includes a forward compartment 32 and a rear compartment 34. In the exemplary watercraft depicted in FIG. 1, a fuel tank 36 and a buoyant block (not illustrated) are located in the forward compartment 32. The buoyant block affords additional buoyancy to the watercraft 10.

An internal combustion engine 38 powers the watercraft 10. The engine 38 is contained within the rear compartment 34 and is mounted primarily beneath the forward portion of the seat 22. Engine mounts secure the engine 38 to the hull lower portion 16 in a known manner.

In the illustrated embodiment, the engine 38 includes three in-line cylinders and operates on a two-stroke crankcase compression principle. This engine type, however, is merely exemplary. Those skilled in the art will readily appreciate that the present exhaust pipe cooling system can be used with any of a variety of engine types having other number of cylinders, having other cylinder arrangements and operating on other combustion principles (e.g., four-stroke principle).

A cylinder block 40 and a cylinder head assembly 42 desirably form the cylinders of the engine 38. Pistons reciprocate within the engine 38 and drive an output shaft, such as a crankshaft, in a known manner. The crankshaft desirably is journaled with a crankcase 44, which in the illustrated embodiment is located beneath the cylinder block 40.

A conventional induction system supplies a fuel/air charge to a plurality of crankcase chambers formed within the crankcase 40. The induction system of the engine 38 includes at least one charge former that receives fuel from the fuel tank 36.

The crankcase chambers of the engine 38 are sealed from one another with each crankcase chamber communicating with a dedicated combustion chamber. The combustion chamber is defined between the corresponding cylinder bore, piston and cylinder head. Because the internal details of the engine 38 desirably are conventional, a further description of the engine construction is not believed necessary to understand and practice the invention.

As seen in FIG. 2, a coupling 46 interconnects the engine crankshaft to an impeller shaft 48. If the engine output shaft is vertically disposed, the impeller shaft 48 will be driven through a bevel gear transmission or a similar transmission. The propeller shaft extends rearwardly to a jet propulsion unit 50 and drives an impeller 52 of the unit 50.

With reference to FIGS. 2–4, the jet propulsion unit 50 is positioned in a tunnel 54 in the rear center of the lower hull section 16. The propulsion unit 50 includes a gullet 56 having an inlet opening 58 formed on the bottom side of the lower hull section 16. The gullet 56 extends from the inlet opening 58 to a pressurization chamber 60. The pressurization chamber 60 in turn communicates with a nozzle section 62 of the propulsion unit 50.

As best seen in FIG. 3, the impeller 52 is located toward the front end of the chamber 60. A central support 64 supports the rear end of the impeller shaft 48 behind the impeller 52 and generally at the center of the pressurization chamber 60. A bearing assembly 65 journals the rear end of the impeller shaft 48 within the support 62.

The rotating impeller 52, which the impeller shaft 48 drives, pressurizes the water within the chamber 60 and forces the pressurized water through the nozzle section of the propulsion unit 50. A steering nozzle 66 directs the exit direction of the water stream exiting the jet propulsion unit 50. The steering nozzle 66 is pivotally supported at the rear of the jet propulsion unit 50 to change the thrust angle on the watercraft 10 for steering purposes as is known in the art.

With reference to FIG. 2, the steering nozzle 66 is connected to a steering handle 68. The steering handle 68 forms part of the operator controls 26 which are mounted in front of the operator seat 22 as noted above. The steering handle 68 also can include a throttle control for controlling the speed of the engine.

The personal watercraft 10 so far described is conventional and represents only an exemplary watercraft on which the present exhaust pipe cooling system can be employed. A further description of the personal watercraft 10 therefore is not believed necessary for an understanding and an appreciation of the present exhaust pipe cooling system. The exhaust and cooling systems, which are desirably used with the engine 38, will now be described in detail.

The propulsion unit 50 supplies cooling water through a conduit 70 to an engine cooling jacket (which FIG. 3 schematically illustrates). For this purpose, as best seen in FIGS. 3 and 4, an outlet port 72 is formed on the housing the pressurization chamber 60 of the jet pump 50. The conduit 70 is coupled to the outlet port 72 and extends to an inlet port 74 to the engine water jacket. In the illustrated embodiment, the inlet port 74 lies at the lower rear end of the engine 38.

The engine cooling jacket extends through cylinder block 40, about the cylinders, and through the cylinder head assembly 42. The cylinder head 42 includes a coolant discharge port 76 through which the cooling water exits the engine 38.

The exhaust system 12 discharges exhaust byproducts from the engine 38 to the atmosphere and/or to the body of water in which the watercraft 10 is operated. As best seen in FIGS. 1 and 3, the exhaust system 12 includes an exhaust manifold that is affixed to the side of the cylinder block 40 and which receives exhaust gases from the combustion chambers through exhaust ports in a well-known manner.

An outlet end 78 of the exhaust manifold communicates with a C-shaped pipe section 80. This C-pipe 80 includes an inner tube 82 that communicates directly with the discharge end 78 of the exhaust manifold. An outer tube 84 surrounds the inner tube 82 to form a water jacket 86 between the inner and outer tubes 82, 84. As schematically illustrated in FIG. 3, the water jacket 86 communicates with the discharge port 76 of engine water jacket.

The outlet end of the C-pipe 80 communicates with an expansion chamber 88. The expansion chamber 88 has a dual shell construction formed by an inner shell 90 which defines an expansion chamber volume. The inner tube 82 of the C-pipe 80 communicates with the expansion chamber volume.

An outer shell 92 is connected to the inner shell 90 and defines a cooling jacket 94 about the inner shell 90. The water jacket 94 of the expansion chamber 88 communicates with the water jacket 86 of the C-pipe 80 to receive cooling water from the engine 38.

The expansion chamber 88 desirably houses a catalyzer 96. In the illustrated embodiment, the catalyzer 96 includes an annular shell 98 supporting a honeycomb type catalyst bed 100. The catalyst bed 100 is formed of a suitable catalytic material such as that designed to treat and render harmless hydrocarbons, carbon monoxide, and oxides of nitrogen. An annular flange 102 supports the annular shell 98 generally at the center of the flow path through the expansion chamber volume. In this manner, all exhaust gas flow through the expansion chamber 88 passes through the catalyst bed 100.

In the illustrated embodiment, the annular flange 102 is held between upper and lower sections of the expansion chamber 88. Each section of the expansion chamber 88 includes the dual shell construction described above. The annular flange 102 also includes a plurality of apertures which place the cooling jackets 94 of the upper and lower sections of the expansion chamber 88 in communication with each other.

The water jacket 94 of the upper section receives cooling water from the water jacket 86 of the C-pipe 80. The upper section of the expansion chamber 88 also includes an inlet port 104 which receives cooling water from the exhaust pipe cooling system, which will be described in detail below.

The lower section of the expansion chamber 88 includes a downwardly turned portion 106 that terminates at a discharge end 108. As seen in FIG. 3, the inner shell 90 stops short of the outer shell 92 such that the water flow through the water jacket 94 merges with the exhaust gas flow through the expansion chamber volume at the discharge end 108.

The lower section of the expansion chamber 88 also includes a discharge port 110. The discharge port is positioned just up stream of the discharge end 108. In this position, a portion of the cooling water flowing through the expansion chamber water jacket 94 flows through a discharge line 112 rather than through the exhaust pipe.

With reference to FIGS. 1 and 2, a flexible pipe section 114 is connected to the discharge end 108 of the expansion chamber 88 and extends rearwardly along one side of the watercraft hull tunnel 54. The flexible conduit 114 connects to an inlet section of a water trap device 116. The water trap device 116 also lies within the watercraft hull 16 on the same side of the tunnel 54.

The water trap device 116 has a sufficient volume to retain water and to preclude the back flow of water to the expansion chamber 88 and the engine 38. Internal baffles within the water trap device 116 help control water flow through the exhaust system 12.

An exhaust pipe 118 extends from an outlet section of the water trap device 116 and wraps over the top of the tunnel 54 to a discharge end 120. The discharge end 120 desirably opens into the tunnel 54 at an area that is close to or actually below the water level with the watercraft 10 floating at rest on the body of water.

With reference to FIGS. 1 and 3, the present exhaust pipe cooling system 121 supplies fresh cooling water to the inlet port 104 of the water jacket 94 that surrounds the expansion chamber 88. For this purpose, in the illustrated embodiment the cooling system 121 includes a mechanical pump 122 which is driven by an electric motor. The pump 122 desirably functions as a bilge pump and draws water from the bilge area within the watercraft hull 16. The pump 122 also functions independent of the jet propulsion device 50 and in some applications continuously draws water from the bilge area. In this manner, the pump 122 delivers cooling water to the inlet port 104 of the expansion chamber water jacket 94 through a delivery line 124, which is connected to an effluent port 126 of the pump 122.

A pickup conduit 128 extends from the pump 122 to a water trap device 130. The pickup conduit 128 is connected to an influent port 132 of the pump 122.

In the illustrated embodiment, the water trap device 130 includes a well formed in the lower hull section 16 at a point beneath the engine 38. Other types of water trap devices, however, can be employed at the pickup end of the conduit 128. Water from the bilge area flows into the water trap device 130. The water trap device 130 desirably is configured to contain a volume of water from the bilge area and to inhibit the flow of water from the water trap device 130 back to the bilge area upon abrupt changes in the direction of travel of the watercraft 10. In this manner, the bilge pump 122 remains primed and does not run dry when the watercraft 10 abruptly changes direction.

The pump 122 also communicates with an auxiliary water pickup port 134. In the illustrated embodiment, the pickup port 134 is located through a wall of the lower hull section 16. The pump 122 draws water into a pickup line 136, which is connected to the port 134, from the body of water in which the watercraft 10 is operating.

A control valve 138 (e.g., a solenoid valve) regulates water flow through the pickup line 136. In the illustrated embodiment, the control valve 138 is a three-way valve which regulates water flow through two inlet ports. One inlet port is connected to the pickup conduit 128 and the other inlet port is connected to the auxiliary water pickup line 136. The outlet port communicates with the pump 122.

An electronic control system of the watercraft 10 controls the operation of the control valve 138 depending upon the exhaust gas temperature at the catalyst bed 100 within the expansion chamber 88. FIG. 3 schematically illustrates this electronic control system.

A temperature sensor 140 is located within the exhaust expansion chamber 88 to determine the temperature of the exhaust gases flowing through the catalyst bed 100, which is generally indicative of the catalyst bed temperature. In the illustrated embodiment, the temperature sensor 140 is located on the downstream side of the catalyst bed 100 just before the down-turn section 106 of the expansion chamber 88. The temperature sensor 140 measures the temperature of the exhaust gases at this location and generates an electrical signal indicative of the sensed temperature.

An electronic control unit (ECU) 142 of the control system receives the signal from the temperature sensor 140. The ECU then compares the sensed temperature against a predetermined desired operational temperature range for the particular catalyst bed 100, which is stored within a memory device of the ECU. In the event that the sensed exhaust temperature approaches or exceeds the upper limit of the desired operational temperature range, the ECU opens the control valve 138 to introduce more fresh cooling water into the water jacket 94 which surrounds the catalyzer 96. The fresh cooling water has a substantially lower temperature than the water flowing through the cooling jacket 94 from the engine cooling jacket. The lower-temperature water consequently absorbs more heat to reduce the temperature within the expansion chamber 88 and thus the temperature of the catalyst bed 100.

During high temperature conditions when the control valve 138 is opened, the ECU 142 also lights a warning lamp 144 positioned at the operators control 26 (FIG. 1) to indicate the elevated running temperature of the engine exhaust system 12. The warning light 144 allows the operator to reduce the engine speed to help cool the exhaust system 12.

The ECU 142 additionally signals an engine speed control circuit 146. The engine speed control circuit 146 retards engine speeds especially when the throttle is held wide open. This effect further helps reduce the temperature of the exhaust system 12.

In this manner, the present exhaust pipe cooling system 121 maintains the temperature of the catalyzer 96 within a desired range of operating temperatures. The cooling system 121 also inhibits damage to the catalyst bed 100 due to overheating.

Figures 5, 6:
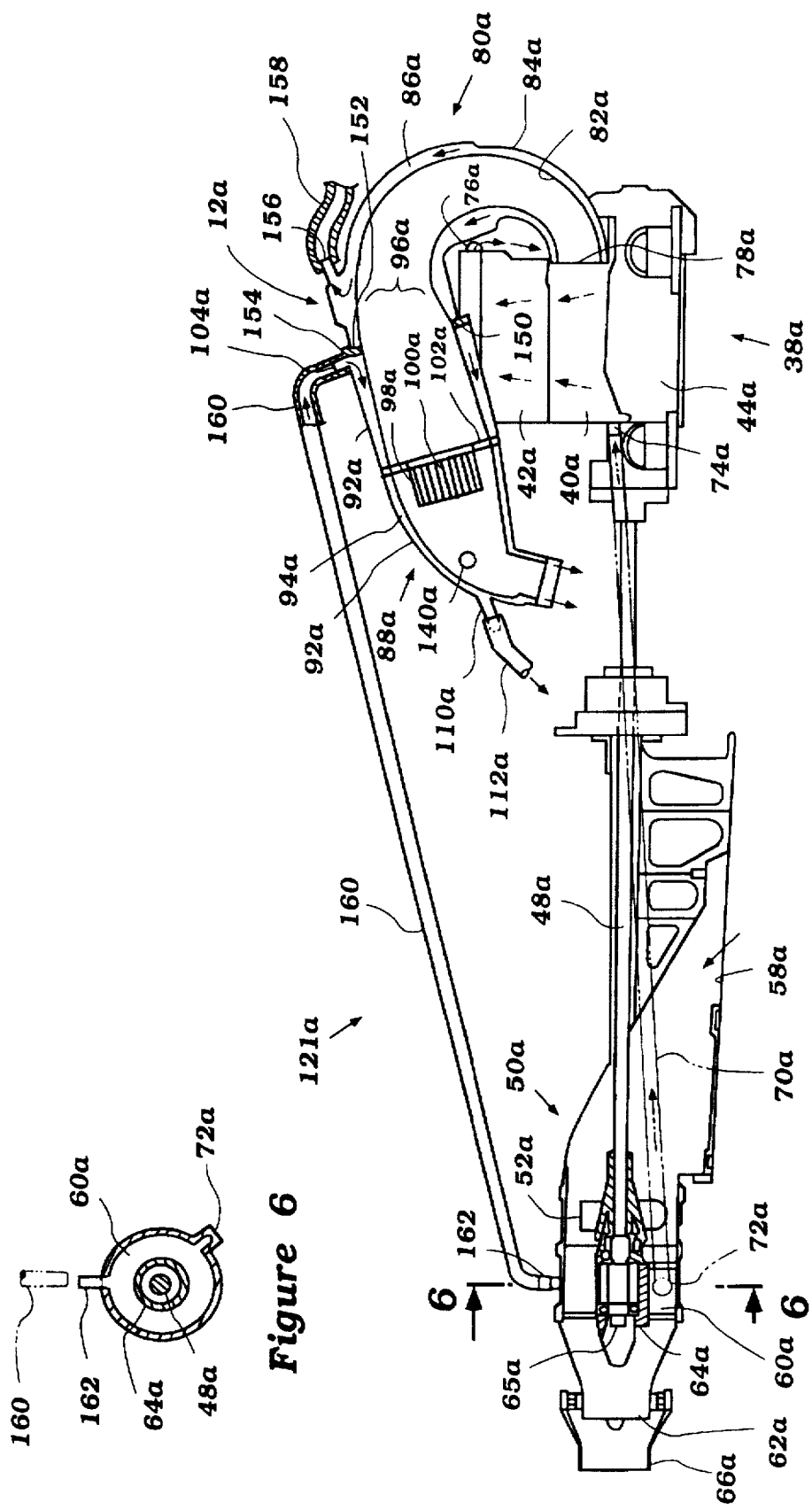
FIG. 5 is a schematic view of an exhaust pipe cooling system configured in accordance with another embodiment of the present invention, shown with a portion of an exhaust system, an engine and a jet propulsion unit of the personal watercraft.
FIG. 6 is a cross-sectional view of the jet propulsion unit of FIG. 5 taken along line 6—6.

FIG. 5 and 6 illustrate an exhaust pipe cooling system which is configured in accordance with another embodiment of the present invention. The cooling system of the embodiment of FIGS. 5 and 6 is substantially identical to that described above, except that the cooling system cooperates with the jet propulsion device rather than using a separate pump. The construction of the water jackets about the expansion chamber also differ. To ease the reader's understanding of the present embodiment, like reference numerals with an "a" suffix are used to indicate similar parts of the two embodiments.

As seen in FIG. 5, the expansion chamber 88a includes a header 150 formed at its upstream end. The inner and outer shells 90a, 92a are connected to the header 150. The C-pipe also includes a header 152 formed at its downstream end into which the inner and outer tubes 82a, 84a terminate. The corresponding headers 150, 152 of the expansion chamber 88a and the C-pipe 80a mate together when assembled with a gasket 154 interposed therebetween. The gasket 154 seals the junction between the C-pipe 80a and the expansion chamber 88a such that the exhaust path continuously extends from the C-pipe 80a into the expansion chamber 88a.

The headers 150, 152, however, prevent fluidic communication between the water jackets 86a, 94a of the C-pipe 80a and the expansion chamber 88a. As such, the C-pipe 80a includes an outlet port 156 through which cooling water from the engine 38 is discharged from the watercraft 10 through a discharge conduit 158. Cooling water into the water jacket 94a about the expansion chamber 88a thus must flow through the inlet port 104a.

A water conduit line 160 extends between the pressurization chamber 60a of the jet propulsion unit 50a and the inlet port 104a on the expansion chamber 88a of the engine exhaust system 12a. In the illustrated embodiment, as seen in FIG. 6, the chamber 60a includes a nipple 162 to which an end of the water conduit 160 can be releasably attached by a hole clamp or a quick-connect coupling. The nipple 162 desirably is located on the upper side of the chamber 60a and is spaced apart from the port 72a to which the engine water jacket conduit 77a is attached.

The end of the water conduit 160 also can be designed to be easily coupled to a conventional garden or utility hose. This would allow a user to conveniently flush the cooling system after use, especially when the watercraft 10 is run in salt water.

In the illustrated embodiment, pressurized water from the chamber 60a continuously flows through the water conduit 160. The water conduit 160 delivers water to the expansion chamber water jacket 94a to cool the catalyst bed 100a.

More water flows through the conduit 160 as engine speed increases because of the resulting increase in pressure within the chamber 60a. The flow rate through the conduit 160 thus depends upon the engine speed which also is proportional to exhaust temperature. The present cooling system 121a thus self-regulates itself to maintain the exhaust gas temperature generally within a desired range of operating temperature.

Although not illustrated, if more precise control over the temperature within the expansion chamber 88a is desired, a control system can operate a control valve to regulate water flow through the water conduit 160. The control valve can be located at the pressurization chamber 60a or anywhere along the length of the water conduit 160. The control system also involves a temperature sensor 140a which measures the temperature within the expansion chamber 88a and sends a signal indicative of the temperature to an ECU of the control system. The ECU operates the control valve in the manner described above. In addition, the ECU can control an engine speed control circuit and can operate an indicator light as described above.

The cooling water from the water conduit 160 flows into a water jacket 94a of the expansion chamber 88a and about the periphery of the expansion chamber volume in which the catalyzer 96a is located. The fresh cooling water absorbs heat from the inner shell 90a of the expansion chamber 88a and carries the heat away to decrease the temperature of the catalyzer 96a. A portion of the cooling water flows through the outlet port 110a to reduce the amount of water that merges with the exhaust gas flow downstream of the catalyst bed 100a. This helps protect the catalyst bed 100a should the watercraft become partially or entirely inverted.

Figures 7, 8:
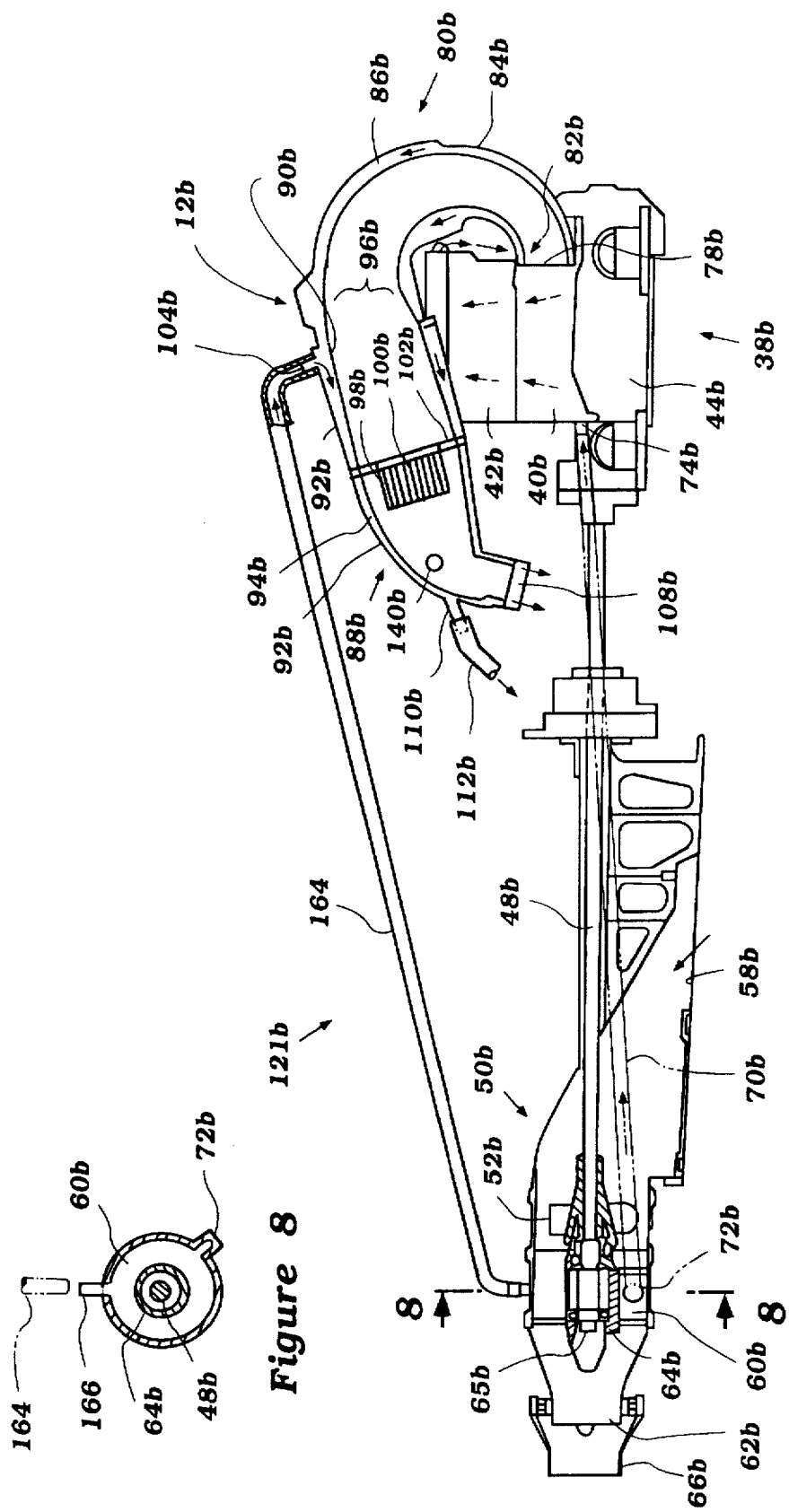
FIG. 7 is a schematic view of an exhaust pipe cooling system configured in accordance with an additional embodiment of the present invention, shown with a portion of an exhaust system, an engine and a jet propulsion unit of the personal watercraft.
FIG. 8 is a cross-sectional view of the jet propulsion unit of FIG. 7 taken along line 8—8.

FIGS. 7 and 8 illustrate an additional embodiment of the present exhaust pipe cooling system which is designed for use in emergency circumstances. Many of the components of the embodiment of these figures are similar to those described above in connection with the embodiment of FIGS. 3 and 4, and thus the above description should be understood as applying equally to the present embodiment, unless indicated to the contrary. For this purpose, like reference numerals with a "b" suffix are used to indicate like parts between the two embodiments.

The cooling system 121b includes a temperature sensor 140b. The temperature sensor 140b is located within the expansion chamber 88b proximate to the catalyzer 96b. The temperature sensor 140b determines the temperature of the exhaust gases within the expansion chamber 88b and generates a signal indicative of the temperature. An ECU of a control system receives this information and compares it to a preset range of operating temperature 5 for the catalyst bed 100b. If the measured temperature approaches or exceeds the upper range of this preset temperature range, the ECU lights an indicator light to signal the operator of the watercraft of the abnormal temperature within the exhaust system 12b.

The user can introduce fresh cooling water into the cooling jacket 94b about the expansion chamber 88b by use of a detachable hose 164. For this purpose, the pressurization chamber 60b of the jet propulsion device 50b includes an outlet port 166 and the expansion chamber includes an inlet port 104b which communicates with the water jacket 94b. In the illustrated embodiment, the outlet port 166 of the chamber 60b desirably includes a quick-connect coupling which remains normally closed. For instance, a ball-type valve or a cap closes the outlet port 166 under normal conditions. The coupling desirably lies on the upper side of the chamber 60b for easy access.

The inlet port 104b also desirably includes a quick-connect coupling which the remains normally closed by any of a variety of conventional means, including, but not limited to, a rotatable or spring-load ball valve or a cap. The coupling is positioned on the upper side of the expansion chamber 88b also for easy access.

Cooling water normally flows from the engine water jacket, through the water jacket 86b of the C-pipe 80b and into the water jacket 94b of the expansion chamber 88b. A portion of the water is diverted from the water jacket through a discharge port 110b on the expansion chamber 88b and is dumped overboard through a discharge conduit 112b. The balance of the cooling water merges with the exhaust gas flow through the exhaust system and is discharged at the discharge end 108b of the expansion chamber 88b.

Under abnormally high operating temperatures, the operator can connect the detachable hose 164 between the outlet port 166 on the jet pump 164b and the inlet port 104b of the expansion chamber water jacket 94b. The hose desirably includes corresponding quick-connect couplings at its ends which cooperate with the quickconnect couplings at the jet pump outlet port 166 and at the expansion chamber inlet port 104b.

Pressurized water from the jet pump chamber 60b flows through the hose 164 and into the expansion chamber water jacket 94b. This fresh cooling water merges with the cooling water from the engine 38 to reduce the temperature of the catalyst bed 100b in the manner described above. Once a normal operating temperature has resumed, the operator may detach the hose 164 and close the corresponding ports 166, 104b.

This detachable coupling of an auxiliary water supply also provides a way to conveniently flush the cooling system of the watercraft exhaust system, especially after use in salt water. The hose 164 can be connected to a source of fresh water (e.g., a garden hose) to run fresh water through the water jackets of the exhaust system and the engine. common to each of the embodiments described above, the cooling system introduces fresh cooling water into the water jacket surrounding the expansion chamber and the catalyzer independent of the engine block cooling system. The fresh coolant helps maintain the catalyzer below an upper operating temperature in order for the catalyzer to operate effectively and efficiently and to prevent damage to the catalyst bed. And in some of the embodiments, the operating temperature is regulated further by controlling the flow rate of fresh coolant into the expansion chamber water jacket.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A watercraft comprising an internal combustion engine having at least one exhaust port and an output shaft, a propulsion device driven by the engine output shaft, an exhaust system extending between the engine exhaust port and a discharge port and including a catalyzer to treat exhaust gases from the engine before discharge through the discharge port, a cooling jacket extending along a portion of the exhaust system in the vicinity of the catalyzer, and a coolant supply system communicating with the cooling jacket independent of the engine.

2. A watercraft as in claim 1, wherein said coolant supply system comprises a coolant pump which delivers coolant directly to the cooling jacket.

3. A watercraft in claim 2, wherein said coolant pump is connected to a bilge water pickup conduit.

4. A watercraft as in claim 2, wherein said coolant pump is connected to a water pickup port open to the body of water in which the watercraft is operated.

5. A watercraft as in claim 4, wherein said coolant supply system additionally comprises a flow regulator to control the water flow to the coolant pump through the pickup port.

6. A watercraft as in claim 5, wherein said coolant supply system additionally comprises a control system which includes a temperature sensor located at a position to determine the temperature of the catalyzer within the exhaust system, and said control system operates the flow regulator in response to the sensed temperature of the catalyzer.

7. A watercraft as in claim 6, wherein said control system communicates with an indicator device to signal an operator of the watercraft when the sensed temperature exceeds a preselected operating temperature.

8. A watercraft as in claim 7, wherein said control system communicates with an engine control circuit.

9. A watercraft as in claim 1, wherein said propulsion device includes a jet pump, and said coolant supply system includes a conduit which is connected between an inlet port of the water jacket and an auxiliary outlet port on the jet pump.

10. A watercraft as in claim 9, wherein said conduit is a detachable hose.

11. A watercraft as in claim 9 additionally comprising a second coolant supply system connected to the engine and to a coolant source.

12. A watercraft as in claim 9 additionally comprising a temperature detection system including a temperature sensor located to determine the temperature of the catalyzer and an indicator light which is lite when the sensed temperature exceeds a preselected upper temperature limit.

13. A watercraft comprising an internal combustion engine having at least one exhaust port and an output shaft, a propulsion device driven by the engine output shaft, an exhaust system extending between the engine exhaust port and a discharge port and including a catalyzer to treat exhaust gases from the engine before discharge through the discharge port, a cooling jacket extending along a portion of the exhaust system in the vicinity of the catalyzer, and a coolant supply system communicating with the cooling jacket and a source of fresh coolant to directly supply fresh coolant to the cooling jacket.

14. A watercraft as in claim 13, wherein said source of fresh coolant is a bilge area within a hull of the watercraft.

15. A watercraft as in claim 14, wherein said coolant supply system includes a bilge pump which delivers bilge water to the cooling jacket.

16. A watercraft as in claim 13, wherein said source of fresh coolant is a water pickup port formed within a hull of the watercraft which opens to the body of water in which the watercraft is operated.

17. A watercraft as in claim 16, wherein said coolant supply system includes a pump which draws water through the pickup port.

18. A watercraft as in claim 17, wherein said coolant supply system includes a control system that operates a valve positioned between the pump and the cooling jacket to regulate the amount of water delivered to the cooling jacket by the pump.

19. A watercraft as in claim 13, wherein said propulsion device includes a jet pump, and said coolant supply system includes a conduit which extends between said jet pump and said cooling jacket.

20. A watercraft as in claim 19, wherein at least one end of said conduit is releasably connected to either the jet pump or the cooling jacket.

21. A watercraft as in claim 20, wherein said conduit is detachably attached to an outlet port of said jet pump and to an inlet port of said water jacket.

22. A watercraft comprising an internal combustion engine disposed within a hull of the watercraft, the engine having at least one exhaust port which communicates with an exhaust system that delivers engine exhaust to a discharge port, the engine including a plurality of cooling passages, a cooling jacket extending along a portion of the exhaust system, a coolant supply system including a pump that is connected to at least the cooling passages of the engine, and a bilge system including a bilge pump, which communicates with the cooling jacket independent of the pump of the coolant supply system to pump bilge water from a bilge area of the hull to the cooling jacket to provide additional cooling of the exhaust system.

23. A watercraft as in claim 22, wherein the bilge pump also communicates with a water pickup port which is formed through the watercraft hull and which opens to the body of water in which the watercraft is operated.

24. A watercraft as in claim 23, wherein a flow regulating device is positioned between the bilge pump and the water pickup port.

25. A watercraft as in claim 24, wherein said flow regulating device is a control valve.

26. A watercraft as in claim 24 additionally comprising a control unit which communicates with a temperature sensor disposed within the exhaust system in the vicinity of the water jacket and which operates said regulating device in accordance with the sensed temperature within exhaust system, whereby the control unit allows more water flow from the water pickup port to the bilge pump when the sensed temperature exceeds a preselected upper temperature limit.

27. A watercraft as in claim 25, wherein said exhaust system additionally includes a catalyzer to treat exhaust gases from the engine before discharge through the discharge port, and said catalyzer is positioned in the vicinity of the water jacket.

\* \* \* \* \*

UNITED STATES PATENT AND TRADEMARK OFFICE
CERTIFICATE OF CORRECTION

PATENT NO. : 5,788,547
DATED : August 4, 1998
INVENTOR(S) : Ozawa et al.

It is certified that error appears in the above-identified patent and that said Letters Patent is hereby corrected as shown below:

On the title, insert item,
[30] Foreign Application Priority Data
Aug. 2, 1995 [JP] Japan.....................7-197699

Signed and Sealed this

Twenty-ninth Day of February, 2000

Attest:

Q. TODD DICKINSON

*Attesting Officer*    *Commissioner of Patents and Trademarks*